(12) United States Patent
Parkhill et al.

(10) Patent No.: US 6,929,826 B1
(45) Date of Patent: Aug. 16, 2005

(54) SELF-ASSEMBLED NANO-PHASE PARTICLE SURFACE TREATMENTS FOR CORROSION PROTECTION

(75) Inventors: Robert L. Parkhill, Stillwater, OK (US); Andrew J. Vreugdenhil, Peterborough (CA); Vsevolod N. Balbyshev, Dayton, OH (US); Michael S. Donley, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 129 days.

(21) Appl. No.: 10/367,496

(22) Filed: Feb. 14, 2003

Related U.S. Application Data
(60) Provisional application No. 60/357,713, filed on Feb. 19, 2002.

(51) Int. Cl.$^7$ .............................. B05D 7/14; B05D 1/02; B05D 1/18
(52) U.S. Cl. ................. 427/387; 106/14.11; 106/14.15; 106/14.41; 106/14.42; 427/386; 427/421; 427/435
(58) Field of Search .......................... 106/14.11, 14.15, 106/14.41, 14.42, 14.44; 427/386, 387, 421, 435

(56) References Cited

U.S. PATENT DOCUMENTS

| | | | | |
|---|---|---|---|---|
| 4,231,910 A | * | 11/1980 | Plueddemann | 524/109 |
| 5,008,328 A | * | 4/1991 | Nakai et al. | 524/759 |
| 5,366,545 A | * | 11/1994 | Yajima et al. | 106/286.4 |
| 5,385,955 A | * | 1/1995 | Tarshiani et al. | 522/31 |
| 5,397,390 A | * | 3/1995 | Gorecki | 106/287.11 |
| 5,514,211 A | | 5/1996 | Marks et al. | |
| 5,650,474 A | * | 7/1997 | Yamaya et al. | 528/12 |
| 5,728,203 A | | 3/1998 | Vorse et al. | |
| 5,885,436 A | * | 3/1999 | Ameen et al. | 205/194 |
| 5,902,645 A | * | 5/1999 | Vorse et al. | 427/387 |
| 5,905,109 A | * | 5/1999 | Shimizu et al. | 524/506 |
| 5,908,544 A | * | 6/1999 | Lee et al. | 205/316 |
| 6,048,910 A | * | 4/2000 | Furuya et al. | 522/86 |
| 6,475,621 B1 | * | 11/2002 | Kohli et al. | 428/411.1 |

FOREIGN PATENT DOCUMENTS

DE      3512337 A1 * 10/1986

OTHER PUBLICATIONS

A.J. Vreugdenhil, V.N. Balbyshev, M.S. Donley, SNAP: Characterization of the solution chemistry and film performance of a silicon sol–gel surface treatment for Al 2024–T3, Polymer Preprint, (Accepted May 2000).

A.J. Vreugdenhil, V.N. Balbyshev, M.S. Donley, Nanostructured Silicon Sol–Gel Surface Treatments For Al 2024–T3 Protection, Journal of Coatings Technology, vol. 73, No. 915, Apr. 2001, pp 35–43.

* cited by examiner

*Primary Examiner*—Anthony J. Green
(74) *Attorney, Agent, or Firm*—Charles E. Bricker; Thomas L. Kundert

(57) ABSTRACT

An aqueous composition for applying to and treating metallic substrates that does not include chrome or chromium-containing compounds, does not include an organic solvent, and promotes adhesion of overcoat layers that are applied to the metallic substrate. The composition is an aqueous solution that includes of two hydrolyzed silanes, and water, wherein the composition has a pH of less than or equal to 5 and is substantially free of organic solvent and any chromium-containing compound.

Also provided is a method for applying a chromium-free treatment on a metallic substrate comprising mixing a cross-liking agent with the above-described composition and applying the resulting mixture to the metallic substrate, and drying the metallic substrate.

4 Claims, No Drawings

SELF-ASSEMBLED NANO-PHASE PARTICLE SURFACE TREATMENTS FOR CORROSION PROTECTION

CROSS REFERENCE TO RELATED APPLICATION

This application claims priority of the filing date of Provisional Application Ser. No. 60/357,713, filed Feb. 19, 2002, the entire contents of which are incorporated by reference.

RIGHTS OF THE GOVERNMENT

The invention described herein may be manufactured and used by or for the Government of the United States for all governmental purposes without the payment of any royalty.

BACKGROUND OF THE INVENTION

The present invention relates to a composition that is useful to protect a metallic substrate, particularly aluminum.

The corrosion of metals used in airplanes induced by the action of acids, salts or atmospheric pollution is well known. Protective coatings for aluminum skinned aircraft begin with a surface pretreatment step which is intended to both clean the surface and prepare the surface for paint application. The coating system consists of a surface treatment, primer and topcoat. The corrosion protection function is performed mainly by the surface treatment and primer portions of the coating system. Such pretreatment steps may involve the application of many combinations of acid, alkaline, or solvent chemicals, all of which are acceptable practice according to ASTM D-1730. The current surface treatments of aluminum aerospace alloys are based on application of solutions containing hexavalent chromium compounds. In the application to aircraft, the entire aircraft is sprayed down with a chromium-based solution and there is a significant hazardous material waste associated with this process.

Consequently, it would be very advantageous to provide a chromium-free, environmentally benign, adhesion promoting composition for a metal substrate.

Accordingly, it is an object of the present invention to provide a novel surface treatment coating for metal pretreatment prior to the application of paint.

It is another object to provide a method for treating metal.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the present invention there is provided an aqueous composition for applying to and treating metallic substrates that does not include chrome or chromium-containing compounds, does not include an organic solvent, and promotes adhesion of overcoat layers that are applied to the metallic substrate.

In a preferred embodiment the composition is an aqueous solution that includes of two hydrolyzed silanes, and water, wherein the composition has a pH of less than or equal to 5 and is substantially free of organic solvent and any chromium-containing compound.

The present invention also provides a method for applying a chromium-free treatment on a metallic substrate comprising mixing a cross-linking agent with the above-described composition and applying the resulting mixture to the metallic substrate, and drying the metallic substrate.

DETAILED DESCRIPTION OF THE INVENTION

The composition of the invention is prepared by mixing an alkoxysilane and an epoxyalkoxysilane in water at a pH of about 5, wherein the molar ratio of alkoxysilane to epoxyalkoxysilane is in the range of 1:2 to 1:4 and the molar ratio of water to total silanes is about 10:1 to 25:1. After mixing, the mixture is aged for about 8 to 96 hours.

Epoxyalkoxysilanes suitable for use in the present invention include 3-glycidoxypropyltrimethoxysilane, 3-glycidoxypropyltriethoxysilane, 3-glycidoxypropylmethyldimethoxysilane, 3-glycidoxypropylmethyldiethoxysilane, and the like. Alkoxysilanes suitable for use in the present invention include tetramethoxysilane, tetraethoxysilane, trimethoxysilane, triethoxysilane, and the like. In a presently preferred embodiment, the epoxyalkoxysilane is 3-glycidoxypropyltrimethoxysilane and the alkoxysilane is tetramethoxysilane.

The coating composition is prepared by the controlled addition of the alkoxysilane and the epoxyalkoxysilane to water at a pH of about 5, with stirring. As noted above, the water silanes ratio is about 10:1 to 25:1. It is important to maintain a relatively high ratio in order to form cyclic structures and avoid formation of linear branched oligomers. After addition of the silanes is complete, the mixture is aged, with continuous stirring, for 8 to 96 hours.

For application of the coating composition, an initiator or cross-linking agent, a surfactant and, optionally, water, are added to the aged silane composition. The resulting composition may be applied by any known coating method, such as, for example, dip-coating or spray coating. The amount of water added to the aged silane composition will vary according to the coating method employed. Those skilled in the art can easily determine the optimum dilution of the composition for the coating method employed.

It is presently preferred to add a corrosion inhibitor to the coating composition when the initiator and surfactant are added. Suitable corrosion inhibitors include aminopiperidine (APP), aminopiperazine (APZ), tetraethyl dimethylenediphosphonate (TMD), mercaptobenzotriazole (MTZ), and the like, as well as combinations thereof. Such corrosion inhibitor is added in an inhibiting amount, typically about 0.1 to 1.0 wt %, preferably about 0.5 wt %.

The initiator can be an amine, such as diethylenetriamine (DETA) or a mono-, di-, or tri-functional aminosilane, as well as bis-aminosilanes. The initiator is employed in an amount of between about 0.25 wt. % and about 5 wt. %, preferably between about 0.5 wt. % and about 3 wt. % with respect to the total composition.

Surfactants which have been found to be particularly beneficial include the fluorinated alkyl esters such as Fluorad® FC-430 and Fluorad® FC-171 supplied by Minnesota Mining and Manufacturing Co.

After addition of the initiator and surfactant, and, optionally, water, the solution is immediately applied to a clean substrate. The coated material is air dried prior to painting or other surface coating.

The following example illustrates the invention:

EXAMPLE

In a scalable container tetramethoxysilane (0.05 mol, 7.9 g, 7.65 mL) and 3-glycidoxypropyltrimethoxysilane (0.15 mol, 35.5 g, 33.13 mL) were added dropwise with stirring to 59.2 mL of 0.05 M acetic acid at an addition rate of about 1 mL per minute. After addition of the silanes was complete, the container was sealed, and the solution was stirred for 3 days.

To 20 mL of the aged solution was added 0.5 mL diethylenetriamine (DETA), 0.2 mL surfactant (0.04 wt. % FC-430 and 0.01 wt. % FC-171) and distilled water to adjust the final volume to 35 mL.

Coupons of aluminum alloy AA2024-T3 were cleaned in a standard four bath cleaning process. The first step was a 10-minute immersion in Oakite® Aluminum Cleaner 164 (alkaline detergent, Oakite Products, Detroit, Mich.) with moderate air agitation at 55–60° C. The second step was a two-minute immersion in distilled water at 50° C. The third step was a 10-minute room-temperature immersion in Turco SMUT-Go NC-B deoxidizer (Turco Products, Westminster, Calif.) with moderate nitrogen agitation. The final step was an immersion in distilled water for two minutes at room temperature. To reduce bath contamination, the substrates were rinsed with flowing distilled water briefly before the second and fourth steps.

The resulting solution was applied to cleaned aluminum alloy panels by dip-coating at a speed of 0.2 cm per second. The coated panels were air dried overnight. These panels are hereinafter referred to as SNAP panels.

For comparison, coupons of aluminum alloy AA2024-T3 were coated with a standard chromate coating. The surface of these panels was treated with B & B Regel alkaline cleaner (MIL-PRF-87937), Octabrite 5096 acid etch (Mil-C-10578D), and Turco Alumigold B chromate conversion coating (MIL-C-81706 material SPEC, and MIL-C-5541 process SPEC). These panels are hereinafter referred to as Alumigold panels.

A portion of the SNAP panels and all of the Alumigold panels were primed with chromated primer Deft 23377G epoxy (MIL-PRF-23377) at 25° C. (±2° C.) and 50% ±5%) relative humidity to a dry film thickness of 15-23 µm. The panels were allowed to cure for two hours before a topcoat was applied.

Topcoat Deft 85285 polyurethane (MIL-C-85285B), Type 1, Color 36173 was applied to a portion of the primed Alumigold panels, under the same experimental conditions as the primer to a dry film thickness of 55-80 µm. Applique film 3M 500 series standard type film qualified to AMS 3603 (MIL-FP-500) was applied to the primed and unprimed SNAP panels and to the remaining primed Alumigold panels.

Corrosion resistance of the thus prepared panels was tested using the salt spray test according to ASTM B117 for 2000 hrs. After the test, the bottom halves of the panels were stripped for visual inspection. The corrosion resistance performance of the panels is given in Table 1, below. It should be noted that the primer, if used, and the topcoat were applied to the front side only. The back sides of all the test panels received only the surface treatment.

TABLE 1

| Surface Treatment | Primer | Top Coat | Performance 2000 h Salt Spray |
|---|---|---|---|
| Alumigold | Chromated Primer | Polyurethane | Passed on the scribe and on the back |
| Alumigold | Chromated Primer | 3M Appliqué (Perforated) | Passed on the scribe and on the back |
| SNAP | Chromated Primer | 3M Appliqué (non-Perforated) | Passed on the scribe, satisfactory on the back |
| SNAP | none | 3M Appliqué (non-Perforated) | Slight corrosion on the scribe and on the back |

Having thus described exemplary embodiments of the present invention, it should be noted by those skilled in the art that the disclosures herein are exemplary only and that alternatives, adaptations and modifications may be made within the scope of the present invention.

We claim:

1. A method for treating a metallic substrate with a chromium-free treatment which comprises mixing an alkoxysilane, an epoxyalkoxysilane and water to provide a first mixture, aging the resulting first mixture for about 8 to 96 hours to provide an aged mixture, adding a cross-linking agent, a surfactant, and, optionally, water to the aged mixture to provide a coating mixture, applying the thus-resulting coating mixture to a prepared metal substrate, and drying the metallic substrate.

2. The method of claim 1 wherein said alkoxysilane is tetramethoxysilane and said epoxyalkoxysilane is 3-glycidoxypropyltrimethoxysilane.

3. The method of claim 2 wherein said molar ratio of alkoxysilane to epoxyalkoxysilane is 1:3, and wherein said molar ratio of water to total silanes in said first mixture is 16:1.

4. The method of claim 2 wherein said cross-linking agent is diethylenetriamine.

* * * * *